United States Patent [19]

Hogan et al.

[11] Patent Number: 4,731,248

[45] Date of Patent: Mar. 15, 1988

[54] PRODUCTION OF PALATABILITY ENHANCERS FROM THE AUTOLYSIS OF FILAMENTOUS FUNGI

[75] Inventors: William C. Hogan, Bridgeton; Dennis L. Gierhart, High Ridge, both of Mo.; Gary D. Hayen, Cincinnati, Ohio

[73] Assignee: Ralston Purina Company, St. Louis, Mo.

[21] Appl. No.: 829,886

[22] Filed: Feb. 18, 1986

[51] Int. Cl.$^4$ ................................................ A23K 1/00
[52] U.S. Cl. ........................................ 426/54; 426/60; 426/805
[58] Field of Search ................. 426/54, 805, 56, 60

[56] References Cited

U.S. PATENT DOCUMENTS

| | | | |
|---|---|---|---|
| 923,070 | 5/1909 | Okazaki . | |
| 2,141,455 | 12/1938 | Weizmann | 99/17 |
| 3,810,997 | 5/1974 | Chien | 426/205 |
| 3,912,822 | 10/1975 | Yokotsuka et al. | 426/44 |
| 3,917,853 | 4/1975 | Greenshields | 426/60 |
| 4,041,181 | 8/1977 | Burrows et al. | 426/55 |
| 4,066,793 | 1/1978 | Eguchi | 426/60 |
| 4,089,978 | 5/1978 | Lugay et al. | 426/60 |
| 4,122,196 | 10/1978 | Robbins-Seeley | 426/60 |
| 4,218,481 | 8/1980 | Chao et al. | 426/60 |
| 4,264,628 | 4/1981 | Hill | 426/7 |
| 4,285,976 | 8/1981 | Akin-Murphy | 426/60 |
| 4,303,680 | 12/1981 | Tanekawa et al. | 426/60 |

FOREIGN PATENT DOCUMENTS

| | | | |
|---|---|---|---|
| 632791 | 12/1961 | Canada | 426/60 |
| 0554854 | 5/1977 | U.S.S.R. | 426/60 |

OTHER PUBLICATIONS

Farrer, "The Autolysis of Yeast", Food Science Abstracts, vol. 28, No. 1, Feb. 1956, pp. 1–12.
Canadian Journal of Botany—vol. 57, No. 18, pp. 1901–1903 (1979), "Effect of the pH on the Degree of Autolysis of Aspergillus Niger".
Agr. Biol. Chem.—vol. 29, No. 11, pp. 1033–1041 (1965), "Studies on the Autolysis of *Aspergillus Oryzae*".
Yeast Cell Envelopes, Biochemistry, Biophysics and Ultrastructure—pp. 129–136 (1981).
Noka—51(8), pp. 75–81 (1977) (Japanese) (Translation attached), "Studies on the Autolysis of *Aspergillus Oryzae*".

*Primary Examiner*—R. B. Penland
*Attorney, Agent, or Firm*—Virgil B. Hill

[57] ABSTRACT

The present invention relates to a process for the production of unique palatability enhancing materials, particularly suited for pet foods, from filamentous fungi biomasses. The palatability enhancing materials are produced by forming a slurry of a filamentous fungal biomass, and preferably an added proteinaceous material, such as meat, which is then autolyzed, in the absence of an added autolysis initiator, at a pH sufficient to form a palatability enhancing autolysate preferably at a pH of between about 2.5 and 10, most preferably of about 3.0 to 7.5. Autolysis is preferably performed at two distinct temperature stages during which endogenous protease and nuclease activity is initiated during the first stage and endogenous nuclease activity is increased during the second temperature stage, followed by substantial deactivation of endogenous protease activity. This unique procedure provides rapid digestion of the fungal biomass and results in the production of an autolysate that enhances the palatability of animal foods.

41 Claims, No Drawings

PRODUCTION OF PALATABILITY ENHANCERS FROM THE AUTOLYSIS OF FILAMENTOUS FUNGI

BACKGROUND OF INVENTION

The present invention relates to a process for the production of a palatability enhancing autolysate from a filamentous fungal biomass.

The autolysis of the various cells is a well recognized phenomenon, and occurs when the endogenous enzymes contained in cells, such as proteases and nucleases digest the components of the cell. Autolysis solubilizes the various degradation products of the cell, including amino acids, peptides, or nucleotides to provide a "self digestion" process for the cell. Yeast autolysis for example has provided a means for the hydrolysis of yeast to result in a variety of autolyzed cellular components which can be used as a seasoning or flavoring for the preparation of sauces, gravies, soups or other materials. The autolysis of yeast, however, is generally a slow reaction and can take as long as several days to obtain a suitable degree of digestion. It is for this reason, that various additives have been proposed for stimulating or accelerating the autolysis of yeast.

U.S. Pat. No. 4,285,976 for example, describes an autolysis process for yeast that is accelerated by the addition of thiamine or pyridoxine and a gradual increase in temperature of the slurry. U.S. Pat. No. 4,218,481 also describes a process in which yeast autolysis is enhanced by the addition of proteases to improve the yield and shorten the time required for autolysis. In spite of the above improvements, these procedures are dependent upon the addition of an autolytic initiator to begin the autolysis process. Typically these materials are plasmolyzing or liquefying agents such as salt and organic solvents which appear to dissolve or solubilize lipophilic substances in the cell thereby permitting the endogenous enzymes to initiate autolysis or destruction of the cell components.

While extensive studies have been carried out relative to the autolysis of yeast, little work has been completed insofar as the autolysis of other types of fungal protein, particularly those derived from the growth or reproduction of filamentous fungi. The class of fungi that is identified as filamentous generally refers to that group of fungi having hyphae or mycelium as contrasted with yeast which lacks this characteristic filamentous structure. Typical filamentous fungi include those of the genus Rhizopus and Aspergillus which have for years been used in the production of fermented food products in the Far East. Typical products produced by these fungi include "Tempeh" which is an Indonesian food grown on cracked soybeans, as well as other pastes and sauces used in Japan and China, such as soy sauce, shoyu and miso. These foods have all been developed from the fermentation of various substrates with Aspergillus or Rhizopus fungi.

Although the autolysis of various fungi such as *A. oryzae* and *A. niger* has been studied for example in *Agriculture Biology Chemistry:* Vol 29, p. 1033–1041 (1965) and in Noka; 51(8), p 25–81 (1977); these studies have still required an initiator, such as ethyl acetate to initiate or induce autolysis of the organism. These studies also had the expectation of possibly producing effective flavor components from the autolysis, however, it was found that pleasantly flavored components did not result. The autolysis of filamentous fungi for the production of palatability enhancing materials has therefore been unsuccessful up to the present time.

The production of desirable palatability enhancing materials from the autolysis of filamentous fungi and biomasses produced therewith, has been unexpectedly achieved in the present invention.

It is therefore an object of the present invention to provide a process for the autolysis of filamentous fungi to produce palatability enhancing materials.

It is a further object of the present invention to provide a process for autolysis of biomasses produced by the growth of filamentous fungi to produce palatability enhancing materials.

It is a still further object of the present invention to provide a procedure for the autolysis of filamentous fungi that is self starting without the need for an added autolysis stimulator or initiator.

It is a further object of the present invention to provide a process for the autolysis of filamentous fungi that is rapid, and provides a relatively high yield of palatability enhancing materials.

It is a further object of the present invention to provide a reliable procedure for the autolysis of filamentous fungi with a high yield of materials that enhance the palatability of animal foods, particularly pet foods.

These and other objects of the present invention will be readily apparent from the following specific description.

SUMMARY OF THE INVENTION

The present invention relates to a process for the production of palatability enhancing materials, from filamentous fungi comprising; forming a slurry containing an edible filamentous fungi or biomass produced therewith, and autolyzing said slurry in the absence of an added autolysis initiator or stimulator. Autolysis is preferably carried out at a pH sufficient to provide a palatability enhancing autolysate preferably at a pH of between about 2.5 and 10 and most preferably at a pH of about 3.0 to 7.5 unless extremely low temperatures are employed, autolysis usually proceeds extremely rapidly. Initial heating of the slurry is carried out at a temperature sufficient to initiate endogenous protease and nuclease activity followed by a second heating step at a temperature sufficient to increase the nuclease activity and substantially inhibit protease activity during the autolysis procedure. These two heating steps typically involve temperatures of about 40° to 57° C. for the activation of endogenous proteases and nucleases and about 59°–85° C. for increasing the activity of endogenous nucleases with substantial inhibition of protease activity. While the two step heating procedure is preferable for producing palatability enhancing materials it is not critical and materials which provide palatability improvement can be produced without the increase in activity nucleases at the higher temperature range. It is highly unique, that the autolysis of the filamentous fungi is self initiating and proceeds rapidly to almost complete digestion of the fungal material in an extremely rapid fashion without need for an added autolysis initiator such as a liquifying or plasmolyzing agent.

Although the process of the present invention is suitable for autolysis of a wide variety of filamentous fungi and the production of palatability enhancers therefrom, it is particularly preferred to employ fungi of the genus Aspergillus and specifically *A. oryzae* or *A. niger*. It is furthermore, unique that these molds can be combined with a variety of protein sources, including fresh meat or other types of meat materials as well as cheese, fish, soy protein and then autolyzed to provide materials that provide a significant degree of palatability enhancement in animal foods, particularly pet foods.

DESCRIPTION OF THE PREFERRED EMBODIMENTS

The process of the present invention comprises forming a slurry of filamentous fungi, usually a biomass that has been produced by growth of the fungi on a suitable medium. A variety of edible, non toxic filamentous fungi can be used in the present invention including molds from the genuses Aspergillus, and Rhizopus. Particularly preferred are the molds *Aspergillus oryzae* and *Aspergillus niger*. It is further not critical to the practice of the present invention as to which specific medium or substrate is used for growth or reproduction of the mold to produce a fungal biomass that can be autolyzed pursuant to the present invention and a variety of grain products or aqueous wastes resulting from grain processing can be employed as a suitable substrate. An economical and preferred substrate for the fungal biomass is soybean whey which represents the waste supernatant from the processing of soy isolate.

Soy bean whey represents the waste liquor or effluent obtained in the isolation of soy proteins. Soybean whey is typically produced by a process of extracting the water soluble constituents from defatted soybeans or defatted soybean flakes with water. The proteins solubilized in this procedure are precipitated at the isoelectric point to separate the protein as a curd. The precipitated protein is then usually washed, neutralized and dried for sale as a protein isolate which is a widely used food ingredient. The supernatant resulting from the acid precipitation step represents the waste liquor identified as soybean whey, which is an effluent that is produced in large quantities from soy isolate or soy concentrate processing. Soy whey, because of its inherent nitrogen content and soluble sugar level represents a disposal problem insofar as its introduction into sewage systems, nevertheless the high level of nitrogen and sugar level that makes it a disposal problem also provides a suitable source for the fermentation of microorganisms and consequently the production of protein biomasses by the growth of filamentous fungi.

The soybean whey used as the growth media for the fungi in the present invention as previously noted typically contains a solids level of about 1.2 to 1.5% by weight with a nitrogen content of about 3.6 to 4.4% by weight of the solids. Typically the soybean whey will have a pH of about 4.2 to 4.7.

The soybean whey, when used as the media for the fermentation of filamentous fungi is initially sterilized or pasteurized, such as by heating or other means for the elimination of any contaminating microorganism that might be present in the soybean whey. Typically, heating of the soybean whey to a temperature of at least about 120° C., for a period of time sufficient to sterilize or pasteurize the whey will prevent the growth of other microorganisms or fungi after inoculation with the desired fungi. Typically the soybean whey is sterilized by heating at a temperature of at least about 120° C. for between about 10 to 20 minutes in order to make the whey suitable for inoculation with the desired fungi as hereinafter described.

Following sterilization of the soybean whey, the whey is inoculated with a filamentous fungi from the genuses Aspergillus or Rhizopus preferably the genus Aspergillus and most preferably either *Aspergillus Oryzae* or *Aspergillus Niger*. Either of these fungi have been found to provide an inoculum for the production of proteinaceous fungal biomasses that have excellent suitability as a starting material in the autolysis procedure of the present invention.

Following inoculation with spores of the Aspergillus organism the slurry is then allowed to ferment under conditions effective for growth of the biomass depending on the medium involved. Typical conditions for the production of the soybean whey biomass is maintaining the pH of the inoculated medium at about 3.0 to 6.5 and preferably about 4.0 to 4.4. It is also important to maintain the temperature of fermentation to about 28° to 32° C. and preferably about 30° C. at least for the soybean whey, for achieving maximum yield of the fungal biomass produced pursuant to the present invention. Although it is not critical to the practice of the present invention, nevertheless mechanical agitation or agitation via the introduction of air in the inoculated media is a conventional step insofar as fermentation procedures and should be carried out for improved growth and distribution of the microorganism throughout the mass and for purposes of maximizing the yield of fungal biomass.

Although non-critical, it is also preferred that the dissolved oxygen level in the fermentation medium be maintained at a level sufficient for rapid growth of the filamentous fungi and preferably above about 50% of oxygen saturation of the medium at the temperature of fermentation and most preferably greater than 80% by weight. The desired level of dissolved oxygen can be maintained by bubbling of air or oxygen into the medium which as noted above, also provides a means for agitation of the medium during fermentation.

The exact time required for growth of the filamentous fungi pursuant to the present invention is a factor dictated primarily by the quantity of fungal biomass desired as well as the exact conditions of Ph or temperature employed for growth of the filamentous fungi. Typical times for growth of these fungal biomasses pursuant to the present invention is about 10 to 30 hours and preferably 20 to 24 hours.

Following growth of the fungi, the biomass is concentrated from the fermentation medium by centrifugation, filtration or similar means and the exact manner of removing the biomass from the fermentation medium is not critical. The fungal biomass as produced by the above process at least on soybean whey, typically has a solids level of about 5 to 17% by weight and preferably about 10 to 12% by weight with a protein level of about 40% on a dry weight basis.

A variety of other substrates can also be used to produce a fungal biomass for autolysis pursuant to the present invention and the present invention is not intended to be limited by the type of substrate used for reproducing the filamentous fungi.

The filamentous fungi or biomass produced therefrom is initially formed into an aqueous slurry having a solids level of about 2 to 12% by weight and preferably about 4 to 7% by weight. A unique aspect of the present invention is that the aqueous slurry that is autolyzed need not consist only of the fungal biomass but may include other proteinaceous materials without limitation. These materials while not essential to the production of the palatability enhancers by autolysis pursuant to the present invention, nevertheless, provide a synergistic effect because of their presence during autolysis to further improve the effectiveness of the resulting flavors. Included among the various materials that can be added to the slurry are proteinaceous ingredients such as fresh meat, rendered meat, meat by-products including meat meal, fish meal, poultry meal and blood meal. Other proteinaceous ingredients such as corn gluten, cheese, cheese whey, or other waste proteinaceous materials can be added to the slurry and the specific mixture of ingredients that can be added to the slurry is not critical to the present invention. Typical, but non-limiting amounts of other proteinaceous materials that can be added to the fungal biomass are about 5 to 90% and preferably about 10 to 30% by weight of the solids contained in the slurry.

After formation of the aqueous slurry containing the fungal biomass and any added substrate or proteinaceous material, additional non-critical ingredients that may also be included are phosphatase inhibitors such as ethylene diamine tetracetic acid (EDTA) or a salt thereof which is added to the aqueous slurry to inhibit the formation of phosphatase during autolysis. Following this the pH of the slurry is adjusted or maintained at a pH sufficient to provide a palatability enhancing autolysate, preferably at a pH of between about 2.5 and 10.5 and most preferably at a pH of about 3.0 to 7.5 and even more preferably a pH of about 3.3 to 3.7.

The slurry is then heated to a temperature sufficient to activate endogenous protease and nuclease activity and begin the autolytic digestion of the proteinaceous material. Typically the temperature range needed for activation of the proteases derived from the filamentous fungi is to heat the slurry to a temperature of about 40°–57° C. with a preferred temperature range of about 50° to 52° C. Although the exact time period during which the temperature is maintained within the above range for activation of the proteases depends on the exact temperature employed nevertheless protease activity rapidly increases upon heating to the noted temperature range and typical times for maintaining the noted temperature range for at least about 10 minutes and preferably 10 minutes to 24 hours and most preferably 120 to 360 minutes. At this point proteolysis is essentially complete and the product at this point provides an excellent palatability enhancer. It is preferred, however, for purposes of the present invention to provide palatability enhancers of maximum effectiveness and it is desirable at this point to elevate the temperature of the slurry to a second temperature level that is higher than the first stage and is sufficient to further increase nuclease activity yet substantially inhibit the action of any phosphatase or proteases that still may be present. This temperature range typically is about 59°–85° C. and preferably is about 70 to 77° C. Heating the slurry to the noted range provides maximum degree of activation of the nucleases and further improves autolysis of the filamentous fungi and any added substrate pursuant to the process of the present invention. The use of a second temperature stage to further stimulate nuclease activity provides materials of an improved degree of palatability enhancement upon addition to various types of food products including pet foods. Autolysis, by increased nuclease activity proceeds rapidly and the exact amount of time the temperature is maintained at the second stage is also entirely dependent upon the exact temperature employed, nevertheless, typical times will be at least about 10 minutes and preferably will range from about 10 to 180 minutes and most preferably 30 to 90 minutes.

Following the increased amount of nuclease activity the slurry is then heated to a temperature sufficient to inactivate any endogenous enzymes present in the mixture at this point and this involves a temperature of at least about 95° C., preferably 120° C. usually for at least about 5 minutes and preferably 10 to 20 minutes. This eliminates any enzymatic activity and effectively terminates autolysis for purposes of the present invention. The further step of heating to inactivate the enzyme provided by this last heating step further improves the flavor characteristics of the various materials derived from autolysis procedure because of additional "browning" type or Maillard reactions that take place which further improve the degree of palatability enhancement of the various materials involved.

Following a complete termination of the autolysis procedure the autolysate is then cooled preferably to a temperature below about 75° C. and preferably below about 50° C. Following this it is preferable, though not critical to the practice of the present invention, that the autolysate be homogenized and then dewatered by a suitable means desired. The exact dewatering means is not critical to the practice of the present invention and various types of conventional drying means including drum drying, spray drying or freeze drying may be used with equal success.

The autolysate can be dried as is or can be combined with a dry substrate or carrier such as whey or similar type of product to effectively dewater the autolysate. The dried product can then be used as an additive for a variety of food products and has been determined to be an effective palatability enhancer for a variety of animal foods, particularly pet foods.

EXAMPLE 1

A filamentous fungal biomass was prepared by the following procedure. 200 l of soybean whey, which has been refrigerated and stored at 7°–10° C. to prevent microorganism growth having a solids level of about 1.5% by weight was pumped into a 300 l stainless steel fermentor, identified as a "Chemapec" unit, manufactured by Chemapec Inc.,230 Crossways Park, Woodbury, N.Y. 11797. This unit has means for controlling pH, dissolved oxygen level, agitation and has temperature control. The temperature of the soybean whey was raised to about 121° C. over a period of 10–20 min and held for 15 minutes at 121° C. with agitation to sterilize the soybean whey.

In a separate operation, sufficient inoculum for the soybean whey was prepared as follows. To each of seven 2 liter Erlenmeyer flasks 400 ml of the soybean whey is added. The whey was sterilized by heating at 121° C. for 15 minutes. To one of the seven flasks 1 ml of a suspension of *Asperqillus oryzae* spores (NRRL 2217) was added. The flask to which the mold was added was then shaken at 400 r.p.m. and maintained at 30° C. for a period of 12-24 hours or until adequate growth of the mold was achieved. The mold growth was judged to be adequate when the culture is whitish with the appearance of applesauce. If inadequate growth has occurred the media is thin and watery. The culture from the single flask was then divided equally among the six other flasks containing sterilized soybean whey. The flasks were then shaken at 400 r.p.m. and maintained at 30° C. for a period of 12-24 hours or until adequate growth of the mold was achieved as described above.

The culture obtained from the six flasks was then divided between two 20 l fermentors described as "LSL/Biolafitte" units manufactured by LSL/Biolofitte, 719 Alexander Road, Princeton, N.J. 08540. Each of these fermentors contained 13 liters of the sterilized soybean whey. Growth of the mold was then carried out in the fermentor for a period of 20–22 hours. During this time the pH of the inoculated medium was maintained at 4.2±0.2, and the dissolved oxygen level at 80% of saturation. The medium was agitated at 350 r.p.m. and maintained at a temperature of 30° C.±2° C. for the noted period of time.

Following elapse of the noted period of time, the contents of the two 20 l fermentor were added to the remaining sterilized soybean whey contained in the 300 l fermentor. After which growth of the mold was allowed to proceed for the period of time and under the conditions described above to produce a larger quantity of a filamentous fungal biomass.

The contents of the fermentor were then gravity filtered through cheese cloth to yield 8500 g of a filamentous fungal biomass product having a solids level of 12% by weight. This wet biomass can then be frozen and stored for future autolysis procedures as described below.

EXAMPLE 2

1000 g of the frozen filamentous fungal biomass that was thawed overnight in a refrigerator produced according to Example 1 was placed in a container to which was added 1000 ml of warm water to form a slurry having a solids level of 6% by weight. The slurry was mixed and the pH was adjusted to 3.5 by the addition of 3N phosphoric acid. The slurry did not include an added autolysis initiator.

The temperature of the slurry was raised to 55°, upon which autolysis of the slurry began immediately. Autolysis was allowed to proceed for a period of 24 hours and the pH maintained at 3.5. Autolysis was terminated by heating or cooking of the autolyzed slurry at the noted pH at 120° C. for 20 minutes. The autolysate was then cooled and freeze dried. The dried autolysate was blended with dried dairy whey at a level of 5% by weight of the whey to form a premix that was tested in Example 8 below.

EXAMPLE 3

1000 g of the frozen filamentous fungal biomass produced according to Example 1 that was thawed overnight in a refrigerator was autolyzed as described in Example 2 except that autolysis was carried out for 6 hours at the noted pH and temperature. Autolysis was terminated by heating or cooking of the autolyzed slurry at the noted pH at 120° C. for 20 minutes, the autolysate was then cooled and freeze dried. The dried autolysate was blended with dried dairy whey at a level of 5% by weight of the whey to form a premix that was tested in Example 8 below.

EXAMPLE 4

1000 g of the frozen filamentous fungal biomass produced according to Example 1 that was thawed overnight in a refrigerator was autolyzed as described in Example 2 except that autolysis was carried out for 3 hours at the noted pH and temperature. Autolysis was terminated by heating or cooling of the autolyzed slurry at the noted pH at 120° C. for 20 minutes. The autolysate was then cooled and freeze dried. The dried autolysate was blended with dried dairy whey at a level of 5% by weight of the whey to form a premix that was tested in Example 8 below.

EXAMPLE 5

1000 g of the frozen, filamentous fungal biomass produced according to Example 1 that was thawed overnight in a refrigerator was autolyzed as described in Example 2 except that autolysis was carried out for 24 hours at 45° C. at the noted pH. Autolysis was terminated by heating of the slurry at the noted pH at 120° C. for 20 minutes. The autolysate was then cooled and freeze dried. The dried autolysate was blended with dried dairy whey at a level of 5% by weight of the whey to form a premix that was tested in Example 8 below.

EXAMPLE 6

1000 g of the frozen filamentous fungal biomass produced according to Example 1, that was thawed overnight in a refrigerator was autolyzed as described in Example 2 except that the slurry having a pH of 3.5 was initially heated to a temperature of 55° C. and maintained at this temperature for 3 hours to activate endogenous protease and nuclease activity. Following this, the slurry was heated to a temperature of 75° C. and maintained at this temperature for 3 hours to increase the level of endogenous nuclease activity. Autolysis was then terminated by heating of the autolyzed slurry at the noted pH at 120° C. for 20 minutes. The autolysate was then cooled and freeze dried. The dried autolysate was blended with dried dairy whey at a level of 5% by weight of the whey to form a premix that was tested in Example 8 below.

EXAMPLE 7

1000 g of the frozen filamentous fungal biomass produced according to Example 1, that was thawed overnight in a refrigerator was autolyzed as described in Example 2 except that the slurry having a pH of 3.5 was initially heated to a temperature of 55° C. and maintained at this temperature for 3 hours to activate endogenous protease activity. Following this, the slurry was heated to a temperature of 75° C. The pH of the slurry was adjusted to 7.5 by the addition of sodium hydroxide and maintained at this temperature for 3 hours to further increase endogenous nuclease activity. Autolysis was terminated by heating the slurry to a temperature of 120° C. for 20 minutes. The autolysate was then cooled and freeze dried. The dried autolysate was blended with dried dairy whey at a level of 5% by weight of the whey to form a premix that was tested in Example 8 below.

EXAMPLE 8

The premixes containing the autolysates from Examples 2–7 were then dusted on a dried extruded dog food composition sold under the trademark "Purina Dog Chow" ® sold by Ralston Purina Co., St. Louis, Mo. The premixes were dusted on the dog food product at a level of 2% by weight, which resulted in the level of fungal autolysate on the product that is set forth in Table 1 below. This dog food product containing the premix was fed dry to the number of dogs listed in Table 1 for a period of 4 days against a control that was an identically formulated product having a level of whey that had been dusted on in an amount of 2% by weight. The control did not however, contain the fungal autolysate.

TABLE 1

| Sample | % fungal Autolysate (by wt) | Total Ration Consumed (g) | Consumption Ratio | No. of Animals Preferred | Statistical Significance |
|---|---|---|---|---|---|
| Control | — | 3553 | 1.3 | 5 | N.S. |
| Example 2 | 0.1% | 2642 | | 3 | |
| Control | — | 2566 | 1.9 | 2 | N.S. |
| Example 3 | 0.1% | 4854 | | 6 | |
| Control | — | 945 | 4.3 | 0 | .02 |
| Example 4 | 0.1% | 4100 | | 7 | |
| Control | — | 2064 | 1.8 | 2 | N.S. |
| Example 5 | 0.1% | 3753 | | 5 | |
| Control | — | 1081 | 3.2 | 1 | .05 |
| Example 6 | 0.1% | 3460 | | 6 | |
| Control | — | 1573 | 2.5 | 2 | N.S. |
| Example 7 | 0.1% | 4011 | | 5 | |

All of the autolysates, except for that from Example 2 enhanced palatability, although only the products from examples 4 and 6 enhanced palatability to a statistically significant level.

EXAMPLE 9

1000 g of the frozen fungal biomass produced according to Example 1 that was thawed overnight in a refrigerator was placed in a container to which was added 1000ml of warm water to form a slurry having a solids level of 6% by weight. The slurry was mixed and the pH adjusted to 5.0 by the addition of 3N phosphoric acid. The slurry did not include an autolysis initiator.

The temperature of the slurry was raised to 55° C., upon which autolysis of the slurry began immediately. Autolysis was allowed to proceed for a period of 24 hours and the pH maintained at 5.0. Autolysis was terminated by heating of the autolyzed slurry at the noted pH at 120° C. for 20 minutes. The autolysate was then cooled and freeze dried. The dried autolysate was then blended with different levels of dried dairy whey to provide premixes containing progressively higher levels of autolysate, as indicated in Table 2 below. The premixes containing the whey and fungal autolysate were then dusted on a dried, extruded cat food composition sold under the trade name "Purina Cat Chow" ® by Ralston Purina Co., St. Louis, Mo. The premixes were dusted on the product at a level of 2% by weight. The cat food products containing the different premixes were fed dry to a group of 8 cats for a period of 4 days against a control which had only a dusting of whey in an amount of 2% by weight but without any added fungal autolysate.

TABLE 2

| Sample | Premix Composition (% by weight of product) | | Consumption Ratio | No. of Animals Preferred | Statistical Significance |
|---|---|---|---|---|---|
| | % Whey | % fungal Autolysate (by wt) | | | |
| Control 1 | 2.00 | — | 1.17 | 8 | .01 |
| | 1.90 | 0.10 | | | |
| Control 2 | 2.00 | — | 1.27 | 6 | N.S. |
| | 1.50 | 0.50 | | | |
| Control 3 | 2.00 | — | 1.08 | 5 | N.S. |
| | 1.00 | 1.00 | | | |

It is apparent from the above information that the addition of the above autolysates enhanced palatability of each product against the control except that only sample 1 containing 0.1% fungal autolysate improved palatability to a statistically significant extent.

To evaluate the effectiveness of the above autolysates insofar as enhancing the palatability of dog food, the dried autolysate was blended with different levels of dried dairy whey to provide premixes containing progressively higher levels of autolysate as indicated in Table 3 below. The premixes were dusted on a dried extruded dog food composition sold under the trade name "Purina Dog Chow" ® by Ralston Purina Co., St. Louis, Mo. The premixes were dusted on the product at a level of 2% by weight. The dog food product containing the different premixes were fed to a group of 5 dogs for a period of 4 days against a control that had only a dusting of whey in an amount of 2% by weight but without any added fungal autolysate.

TABLE 3

| Sample | Premix Composition (% by weight of product) | | Consumption Ratio | No. of Animals Preferred |
|---|---|---|---|---|
| | % Whey | % fungal Autolysate (by wt) | | |
| Control 1 | 2.00 | — | 0.45 | 1 |
| | 1.95 | 0.05 | | |
| Control 2 | 2.00 | — | 4.56 | 5 |
| | 1.90 | 0.10 | | |
| Control 3 | 2.00 | — | 4.56 | 5 |
| | 1.50 | 0.50 | | |
| Control 4 | 2.00 | — | 2.33 | 4 |
| | 1.00 | 1.00 | | |

While, no statistical evaluation was completed insofar as the above results, it is apparent from the high consumption ratio, which is the ratio of test ration consumed against the amount of control consumed that the palatability of dog food products containing levels of autolysate greater than 0.05% were significantly improved.

EXAMPLE 10

668 g of the frozen filamentous fungal biomass produced according to Example 1 that was thawed over night in a refrigerator was placed in a container to which was added 311 ml of warm water to form a slurry having a solids level of 8% by weight. Ground fresh liver was added to the slurry to provide a level of liver in the slurry equal to 10% By weight of the fungal solids in the slurry. The slurry was mixed and separated into 3 portions. The pH of one portion of the slurry was adjusted to 3.5, the second to 5.5, and the third portion to 7.5. None of the slurry portions contained an added autolysis initiator.

The temperature of each portion of the slurry having the different pH levels was raised to 55° C. and held at this temperature for 6 hours. The pH of each portion was maintained at the noted value during autolysis. After the 6 hour autolysis' period the pH of each slurry was adjusted to 3.5 and the autolysis terminated by heating at 120° C. for 15 minutes. Each autolysate was then sprayed as a liquid at 5% solids on a dried, extruded cat food composition sold under the trade name "Purina Cat Chow" ® by Ralston Purina Co., St. Louis, Mo. The amount of each of autolysate applied to the cat food composition was 1% by weight of the cat food. The treated cat food products, containing the fungal autolysates which were autolyzed at different pH levels, were fed dry to the number of cats listed in Table 5 for a period of 4 days, against a control sample which had not been treated with the autolysate. The results of this test are set forth in Table 5.

TABLE 5

| Sample | pH of Autolysate | % fungal Autolysate (by wt) | Total ration Consumed | Consumption Ratio | No. of Animals Preferred | Statistical Significance |
|---|---|---|---|---|---|---|
| Control | — | — | 859 | 5.02 | 0 | P .01 |
| 1 | 3.5 | 1.0 | 4311 | | 17 | |
| Control | — | — | 652 | 6.06 | 0 | P .01 |
| 2 | 5.5 | 1.0 | 3952 | | 18 | |
| Control | — | — | 1242 | 3.57 | 0 | P .01 |
| 3 | 7.5 | 1.0 | 4428 | | 17 | |

It is apparent from the above data that as the pH of autolysis varied between 3.5 and 7.5, autolysates produced at these pH levels significantly enhanced the palatability of cat food products to cats.

Statistical evaluation was performed in accordance with the Wilcoxon Signed Rank Test. This test is believed to provide a reliable statistical determination of whether there is, in fact, a preference for either ration in this type of palatability experiment wherein the test ration and control ration are simultaneously presented to each dog on a free choice basis.

The Wilcoxon signed rank test was proposed by F. Wilcoxon in *Biometrics Bulletin*, 1:80 (1945). Explanations and applications of this test may be found in: G. W. SNEDECOR, W. G. COCHRAN. *Statistical Methods*, 6th ed., pp. 128-130. The Iowa State University Press, Ames, Iowa (1957); *Experimental Statistics*, pp. 16-1 to 16-3. United States Department of Commerce, National Bureau of Standards Handbook 91 (1963); R. G. D. STEEL, J. H. TORRIE. *Principles and Procedures of Statistics*, pp. 402-403. McGraw-Hill Book Company, Inc., New York (1960); C. I. BLISS. *Statistics in Biology*, pp. 225-228. McGraw-Hill Book Company, Inc., New York (1957).

The foregoing Examples represent specific and non-limiting embodiments of the present invention. It is intended to include within the scope of the present invention all reasonable, modifications, equivalents or substitutions thereto.

We claim:

1. A process for the production of a palatability enhancing autolysate for pets comprising;
   (a) forming a slurry comprising an edible filamentous fungal biomass obtained from filamentous fungi selected from the genuses consisting of Aspergillus and Rhizopus grown on a fermentation medium comprising soybean whey
   (b) autolyzing said slurry in the absence of an added autolysis initiator, at a pH of about 2.5-10.5 wherein autolysis is initiated by heating of the slurry to a first temperature stage sufficient to activate endogenous protease and nuclease activity, followed by heating said slurry to a second temperature stage, higher than the first stage that is sufficient to further increase endogenous nuclease activity and provide a palatability enhancing autolysate.

2. The process of claim 1 wherein said slurry includes an added protein material.

3. The process of claim 2 wherein said protein material is added in an amount of about 5 to 90% by weight of the solids in the slurry.

4. The process of claim 3 wherein the added protein material is present in an amount of about 10 to 30% by weight of the solids in the slurry.

5. The process of claim 3 wherein said added material is meat.

6. The process of claim 1 wherein said Aspergillus fungi is selected from the group consisting of *Aspergillus oryzae* and *Aspergillus niger*.

7. The process of claim 1 wherein said biomass is obtained by growth of filamentous fungi on a fermentation media comprising soybean whey.

8. The process of claim 7 wherein said biomass is grown at a pH of about 3.0 to 6.5.

9. The process of claim 8 wherein said biomass is grown at a pH of about 4.0 to 4.4 and a temperature of about 28°-32° C.

10. The process of claim 1 wherein said slurry has a solids level of about 2 to 12% by weight.

11. The process of claim 10 wherein said slurry has a solids level of about 4 to 7% by weight.

12. The process of claim 1 wherein said slurry includes a phosphatase inhibitor.

13. The process of claim 12 wherein said inhibitor is EDTA.

14. The process of claim 1 wherein said first temperature stage is about 40° to 57° C.

15. The process of claim 14 wherein said first temperature stage is about 50° to 52° C.

16. The process of claim 1 wherein said second temperature stage is about 59° to 85° C.

17. The process of claim 16 wherein said second temperature stage is about 70° to 77° C.

18. The process of claim 1 wherein said first temperature stage is maintained for at least about 10 minutes.

19. The process of claim 1 wherein said second temperature stage is maintained for at least about 10 minutes.

20. The process of claim 1 wherein said slurry is heated to a temperature of at least about 95° C., following the second temperature stage to terminate autolysis.

21. The process of claim 1 wherein the pH is about 3.0 to 7.5.

22. The process of claim 21 wherein the pH is about 3.3 to 3.7.

23. The process of claim 1 wherein said slurry is dewatered after autolysis to provide a dried palatability enhancing autolysate.

24. The product produced by the process of claim 1.

25. A process for the production of a pet food product of improved palatability comprising:
   (a) forming a slurry comprising an edible filamentous fungal biomass obtained from filamentous fungi selected from the genuses consisting of Aspergillus and Rhizopus grown on a fermentation medium comprising soybean whey
   (b) autolyzing said slurry in the absence of an added autolysis initiator, at a pH of about 2.5-10.5, wherein autolysis is initiated by heating of the slurry to a first temperature stage sufficient to activate endogenous protease and nuclease activity, followed by heating said slurry to a second temperature stage, higher than the first stage that is sufficient to further increase endogenous nuclease activity and provide a palatability enhancing autolysate; and (c) applying said autolysate to a pet food product to improve the palatability thereof.

26. the process of claim 25 wherein said first temperature stage is about 40° to 57° C.

27. The process of claim 25 wherein said first temperature stage is about 50° to 52° C.

28. The process of claim 25 wherein said second temperature stage is about 59° to 85° C.

29. The process of claim 28 wherein said second temperature stage is about 70° to 77° C.

30. The process of claim 25 wherein said slurry includes an added protein material.

31. The process of claim 30 wherein said protein material is added in an amount of about 5 to 90% by weight of the solids in the slurry.

32. The process of claim 31 wherein the added protein material is present in an amount of about 10 to 30% by weight of the solids in the slurry.

33. The process of claim 25 wherein said added material is meat.

34. The process of claim 25 wherein said Aspergillus fungi is selected from the group consisting of *Aspergillus Oryzae* and *Aspergillus niger*.

35. The process of claim 25 wherein said biomass is grown at a pH of about 3.0 to 6.5.

36. The process of claim 35 wherein the biomass is grown at a pH of about 4.0 to 4.4 and a temperature of about 28°–32° C.

37. The process of claim 25 wherein the fermentation media has a dissolved oxygen level above about 50% of saturation of the media at the temperature of fermentation.

38. The process of claim 25 wherein said slurry has a solids level of about 2 to 12% by weight.

39. The process of claim 25 wherein said slurry has a solids level of about 4 to 7% by weight.

40. The process of claim 25 wherein said slurry includes a phosphatase inhibitor.

41. The process of claim 40 wherein said inhibitor is EDTA.

* * * * *